(12) United States Patent
Hon

(10) Patent No.: US 12,130,427 B2
(45) Date of Patent: Oct. 29, 2024

(54) LASER PROCESSING DEVICE FOR FORMING VIAS

(71) Applicant: E&R ENGINEERING CORPORATION, Kaohsiung (TW)

(72) Inventor: Schang-Jing Hon, Kaohsiung (TW)

(73) Assignee: E&R ENGINEERING CORPORATION, Kaohsiung (TW)

( * ) Notice: Subject to any disclaimer, the term of this patent is extended or adjusted under 35 U.S.C. 154(b) by 490 days.

(21) Appl. No.: 17/696,537

(22) Filed: Mar. 16, 2022

(65) Prior Publication Data

US 2023/0228987 A1    Jul. 20, 2023

(30) Foreign Application Priority Data

Jan. 20, 2022   (TW) .................................. 111102488

(51) Int. Cl.
| | |
|---|---|
| G02B 26/10 | (2006.01) |
| B23K 26/064 | (2014.01) |
| B23K 26/073 | (2006.01) |
| B23K 26/082 | (2014.01) |
| G02B 5/00 | (2006.01) |
| G02B 19/00 | (2006.01) |

(Continued)

(52) U.S. Cl.
CPC .......... *G02B 26/105* (2013.01); *B23K 26/064* (2015.10); *B23K 26/0734* (2013.01); *B23K 26/082* (2015.10); *G02B 5/001* (2013.01); *G02B 19/0009* (2013.01); *G02B 19/0047* (2013.01); *G02B 27/0927* (2013.01); *B23K 2103/56* (2018.08)

(58) Field of Classification Search
None
See application file for complete search history.

(56) References Cited

U.S. PATENT DOCUMENTS

| | | |
|---|---|---|
| 2017/0158551 A1 | 6/2017 | Bookbinder et al. |
| 2022/0314366 A1* | 10/2022 | Calefati ................. B23K 26/03 |

FOREIGN PATENT DOCUMENTS

| | | |
|---|---|---|
| CN | 105458529 A | 4/2016 |
| CN | 108555464 A | 9/2018 |
| CN | 109514099 A | 3/2019 |

(Continued)

OTHER PUBLICATIONS

Brief English explanation of each listed foreign language reference, Total of 3 pages.

*Primary Examiner* — Jennifer D. Carruth
(74) *Attorney, Agent, or Firm* — Apex Juris, pllc; R. Lynette Wylie

(57) ABSTRACT

A laser processing device for forming vias has a galvo mirror module, a first lens, a second lens, a focusing module, and a laser source. The laser source emits a laser beam through the first lens and the second lens to convert the laser beam into an incident ring beam. The galvo mirror module reflects the incident ring beam into a reflected ring beam into the focusing module to convert the reflected ring beam into a Bessel-like beam. The galvo mirror module has a scanning direction and shifts a reflection direction of the reflected ring beam to move an end of the reflected ring beam along the scanning direction. The focusing module has a third lens linearly slid along the scanning direction to reduce variations in shape and laser fluence of the Bessel-like beam focused at different positions.

15 Claims, 9 Drawing Sheets

(51) Int. Cl.
*G02B 27/09* (2006.01)
*B23K 103/00* (2006.01)

(56) References Cited

FOREIGN PATENT DOCUMENTS

| | | |
|---|---|---|
| CN | 113333965 A | 9/2021 |
| JP | 2020-531392 A | 11/2020 |
| JP | 2021-085984 A | 6/2021 |

\* cited by examiner

LASER PROCESSING DEVICE FOR FORMING VIAS

BACKGROUND OF THE INVENTION

1. Field of the Invention

The present invention relates to a laser processing device for forming vias, and more particularly to a laser processing device that has an adjustable focused position of a laser beam with less variation of laser fluence for forming multiple through vias rapidly in a substrate.

2. Description of the Prior Art

Laser processing has been applied for forming through silicon vias (TSV) or through glass vias (TGV), using a laser beam to irradiate into a silicon or glass substrate to form through vias in the said substrate.

With reference FIG. 9, a conventional Bessel beam laser device is configured to convert a Gaussian beam GB into a ring beam RB through an axicon lens 91 and at least one lens 92 and converts the ring beam RB into a Bessel beam BB through a converging lens 93. The Bessel beam BB, which has long depth of focus and is non-diffracting, maintains an unchanged transversal distribution of intensity as it propagates along a direction of beam propagation, and is suitable to form high aspect ratio through vias.

However, the Bessel beam BB of the conventional Bessel beam laser device has a fixed focused position. For forming multiple through vias in a substrate, the substrate is moved relative to the Bessel beam BB to let the Bessel beam BB sequentially located at different positions of the substrate to form multiple through vias. Because a stage carrying the substrate for moving is heavy, a moving speed thereof is slow, and manufacturing lead time for forming multiple through vias in the substrate is prolonged.

Adjusting a path of the laser beam might change a focused position of the laser beam relative to the substrate. However, the laser beam will be deviated from the focus axis of the converging lens 93 while passing through the converging lens 93, so distances between focused points of the laser beam and the converging lens 93 along the focus axis thereof will be changed at different focused positions, whereby the focused points may not be located in the substrate to form through vias in the substrate. To overcome the shortcoming, it needs to select a converging lens 93 that has a small converging angle with a long focal length to increase a length of depth of focus of the Bessel beam BB. Accordingly, it needs to output a larger laser energy to achieve the same laser fluence, thereby causing energy waste and increasing roughness of the interior surface of the through vias. In addition, because the lengths of the depth of focus, the shapes, and the laser fluences of the Bessel beam BB change at different focused positions, the through vias formed in the substrate at different positions cannot be kept with the same qualities.

Accordingly, the conventional laser processing device for forming vias cannot rapidly process and form good quality through vias at the same time.

To overcome the shortcomings, the present invention provides a laser processing device for forming vias to mitigate or obviate the aforementioned problems.

SUMMARY OF THE INVENTION

The main objective of the present invention is to provide a laser processing device for forming vias that can rapidly form multiple through vias with good processing quality in a substrate.

The laser processing device for forming vias comprises a galvo mirror module, a first lens, a second lens, a focusing module, and a laser source. The galvo mirror module has an incidence side, a reflection side, and a scanning direction. The first lens is an axicon lens and is located at the incidence side of the galvo mirror module. The second lens is located between the first lens and the galvo mirror module and is coaxially aligned with the first lens. The focusing module is located at the reflection side of the galvo mirror module and has a third lens linearly slid along the scanning direction of the galvo mirror module. The laser source is configured to emit a laser beam through the first lens and the second lens to convert the laser beam into an incident ring beam. The galvo mirror module is configured to reflect the incident ring beam into a reflected ring beam. The third lens of the focusing module is configured to convert the reflected ring beam into a Bessel-like beam. The galvo mirror module is configured to shift a reflection direction of the reflected ring beam to move an end of the reflected ring beam along the scanning direction of the galvo mirror module. The third lens of the focusing module is slid along the scanning direction of the galvo mirror module to a corresponding position according to a relative movement of the end of the reflected ring beam.

Other objectives, advantages and novel features of the invention will become more apparent from the following detailed description when taken in conjunction with the accompanying drawings.

DETAILED DESCRIPTION OF THE PREFERRED EMBODIMENTS

Figure 1:
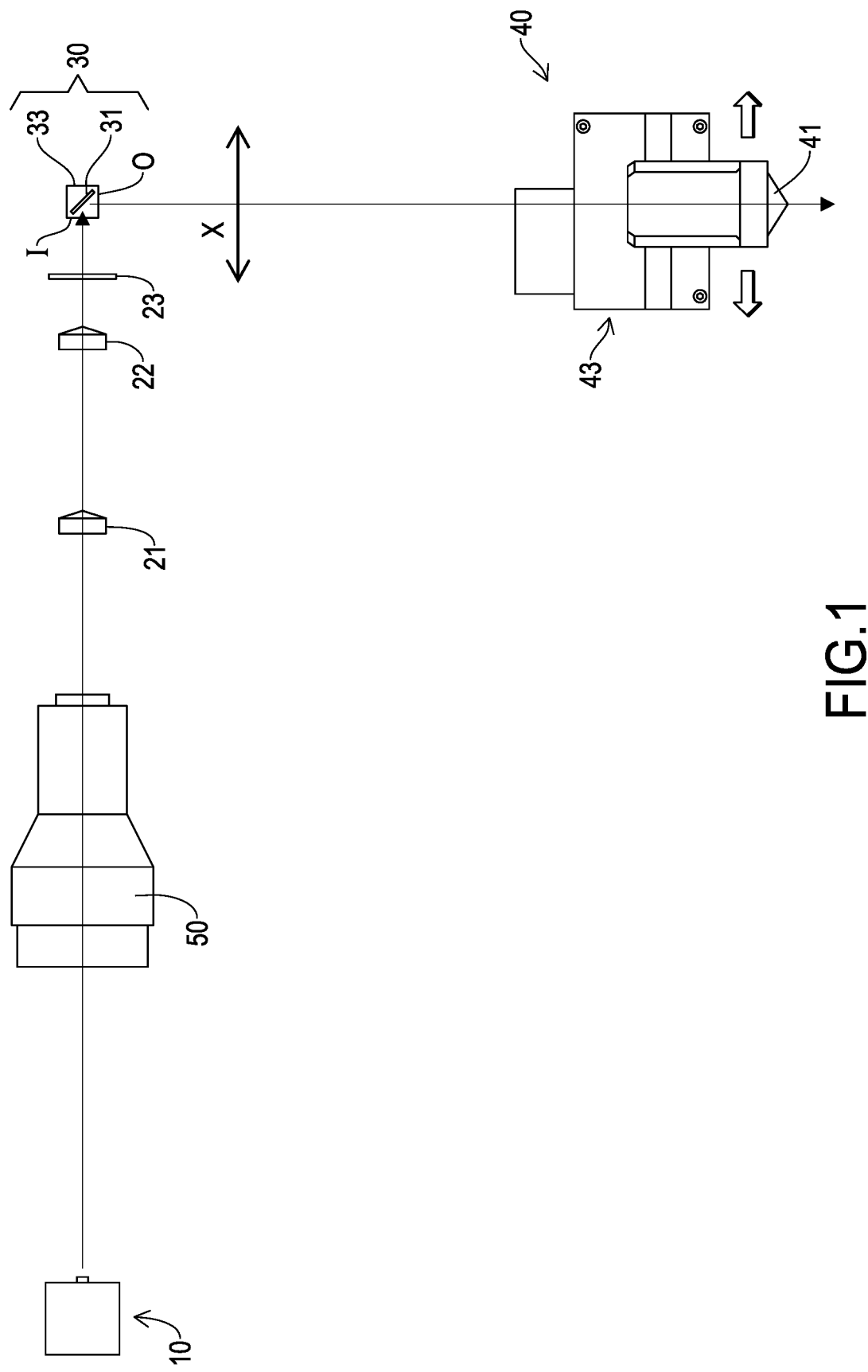
FIG. 1 is a schematic view of an embodiment of a laser processing device for forming vias in accordance with the present invention.
Figure 2:
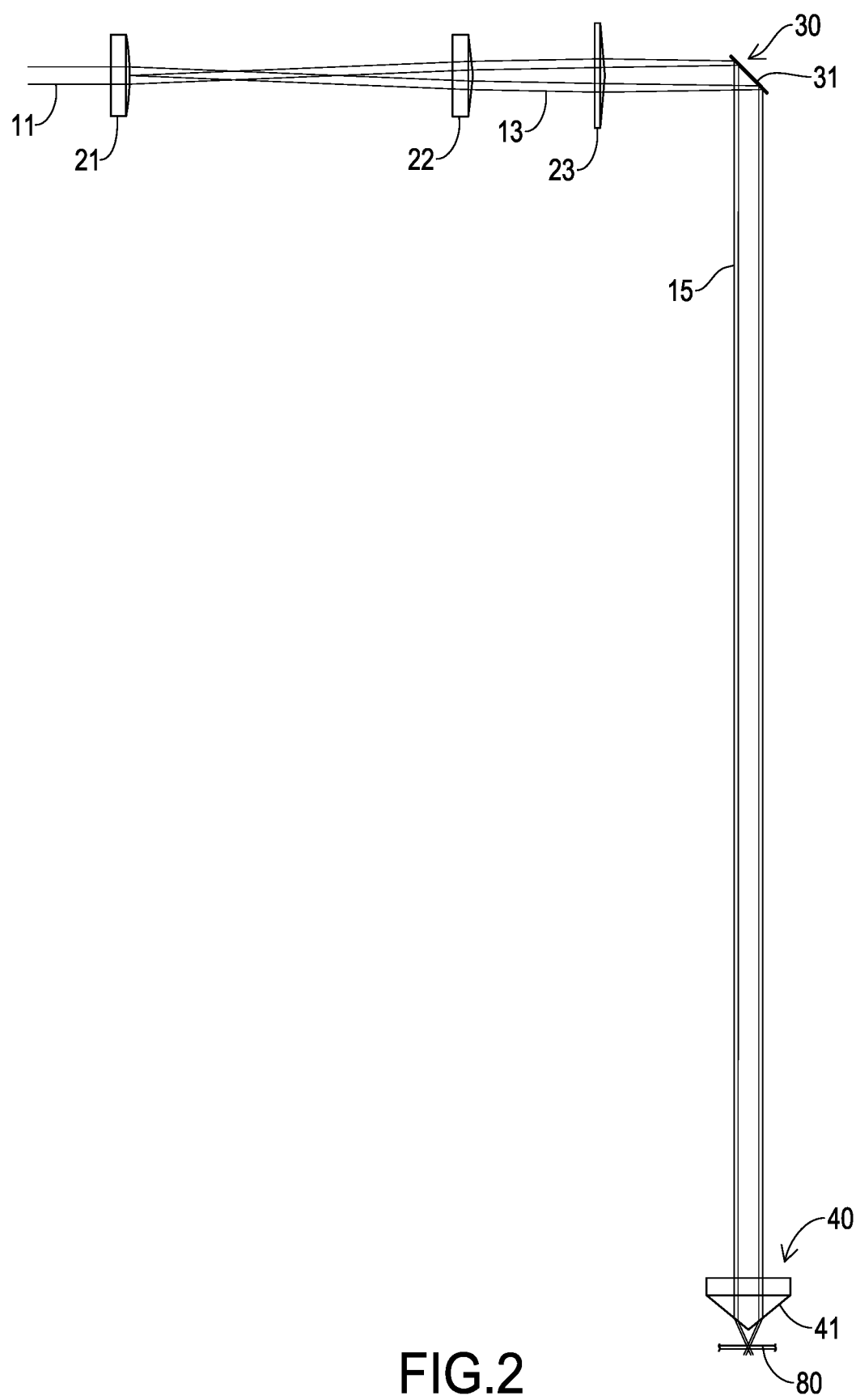
FIG. 2 is a schematic view of a beam path of the laser processing device in FIG. 1.
Figure 3:
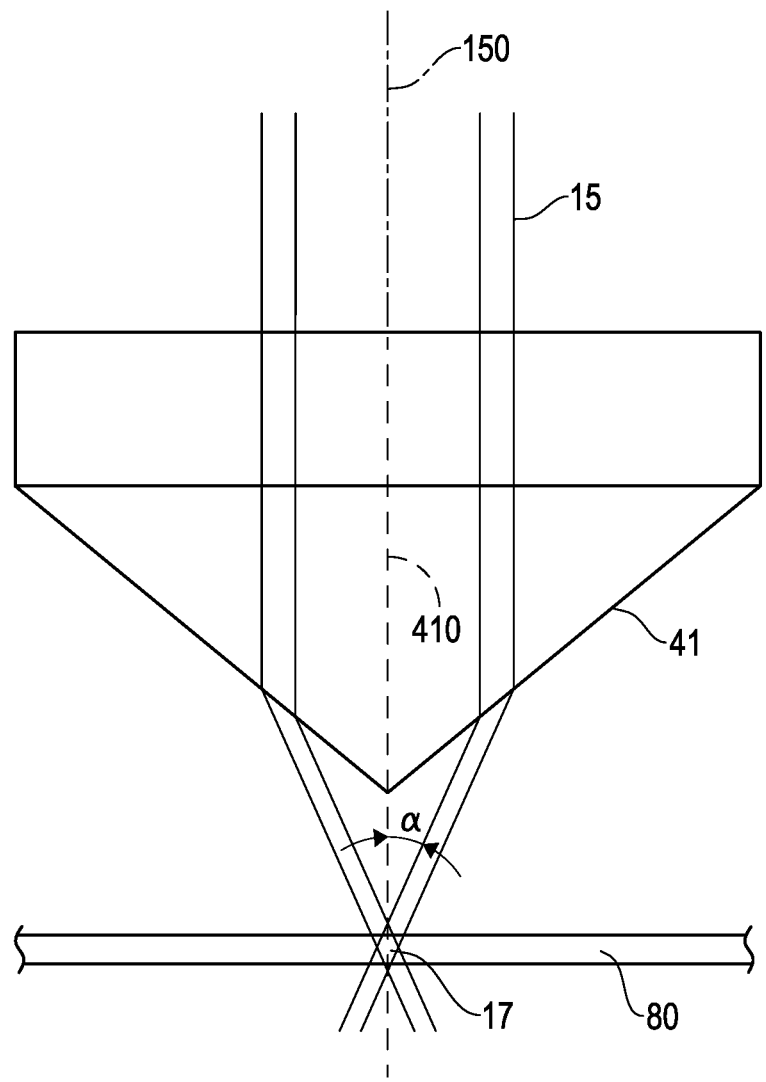
FIG. 3 is an enlarged schematic view of the beam path of the laser processing device in FIG. 2 showing a Bessel-like beam passing through a substrate to form a through via.

With reference to FIGS. 1 to 3, an embodiment of a laser processing device for forming vias in accordance with the present invention comprises a galvo mirror module 30, a first lens 21, a second lens 22, a focusing module 40, and a laser source 10.

Figure 8:
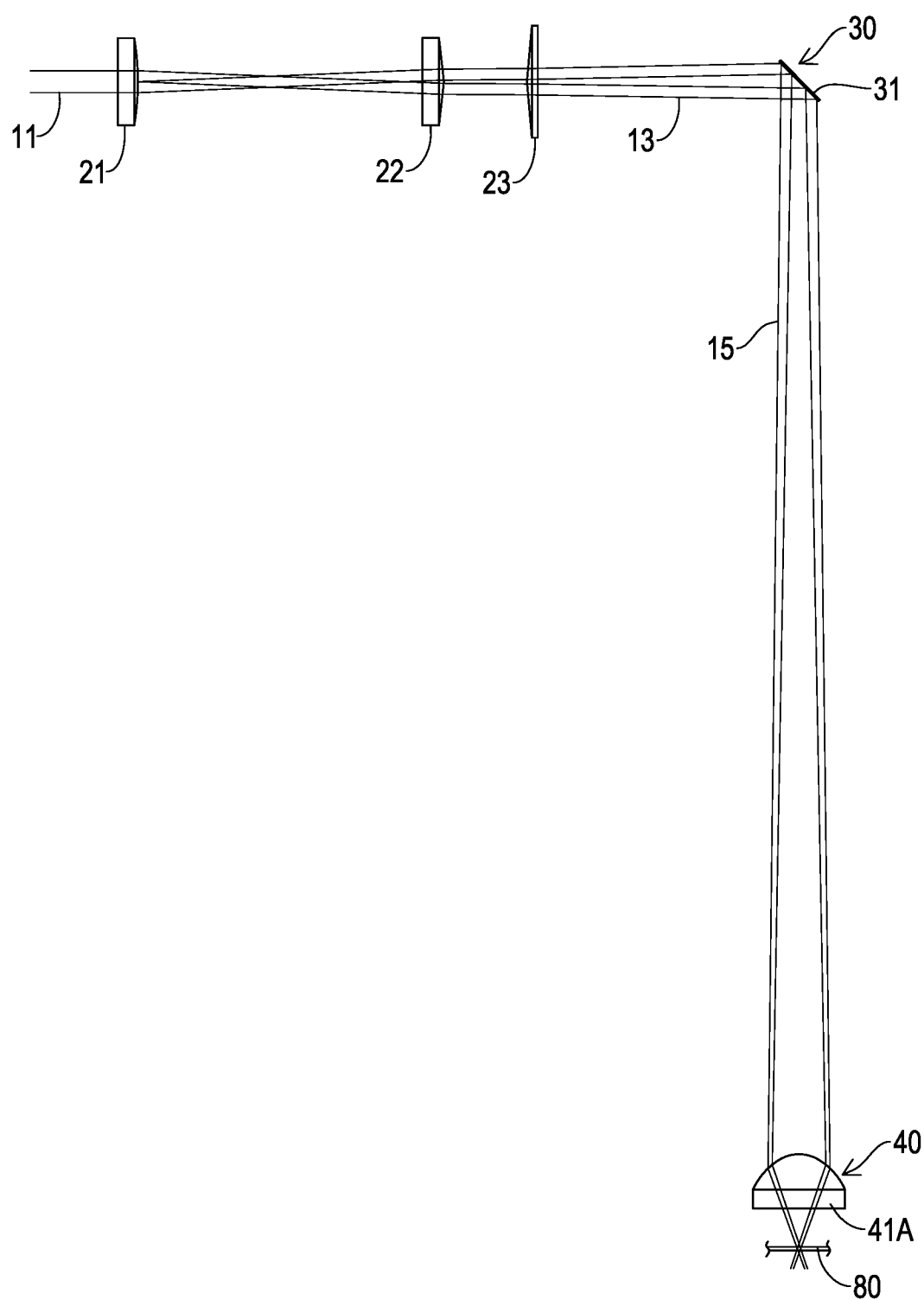
FIG. 8 is a schematic view of a beam path of another embodiment of a laser processing device in accordance with the present invention.
Figure 9:
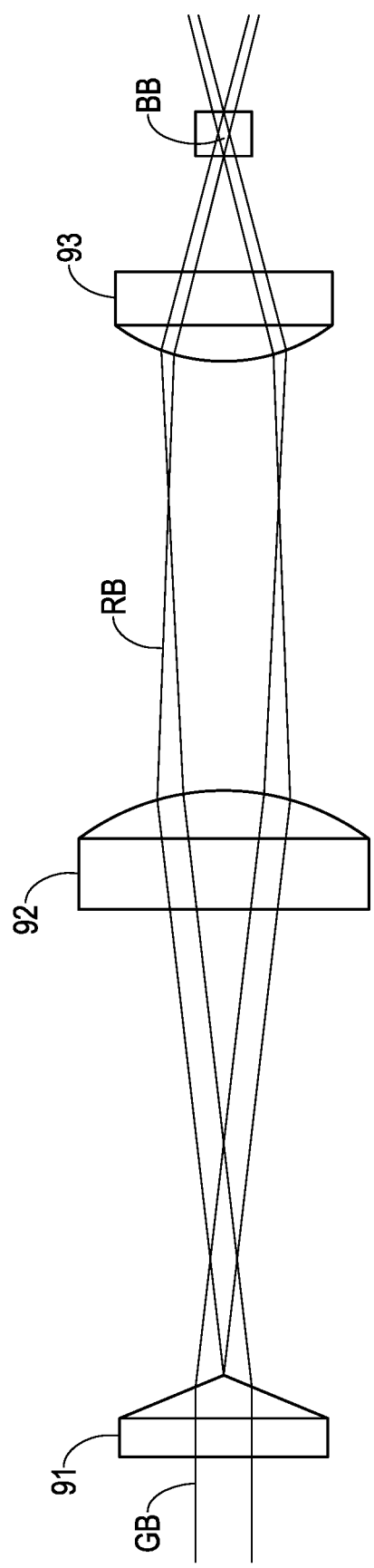
FIG. 9 is a schematic view of a laser processing device for forming vias in accordance with the prior art.

The galvo mirror module 30 has an incidence side I, a reflection side O, and a scanning direction X. The first lens 21 is an axicon lens and is located at the incidence side I of the galvo mirror module 30. The second lens 22 could be a converging lens or an axicon lens, is located between the first lens 21 and the galvo mirror module 30, and is coaxially aligned with the first lens 21. The focusing module 40 is located at the reflection side O of the galvo mirror module 30 and has a third lens 41 slid along the scanning direction X of the galvo mirror module 30. The third lens 41 has a focus axis 410 being perpendicular to the scanning direction X of the galvo mirror module 30. As shown in FIG. 2, the third lens 41 could be an axicon lens having a conical surface facing a substrate 80. As shown in FIG. 8, the third lens 41A could be a converging lens, e.g. an aspherical lens, and a convex surface of the converging lens faces away from the substrate 80.

With reference to FIGS. 1 to 3, the laser source 10 is configured to emit a laser beam 11, e.g. Gaussian Beam into the first lens 21. The laser beam 11 is converted into an incident ring beam 13 through the first lens 21 and the second lens 22. The galvo mirror module 30 reflects the incident ring beam 13 into a reflected ring beam 15, and the reflected ring beam 15 is converted into a Bessel-like beam 17 through the third lens 41 of the focusing module 40.

Figure 5:
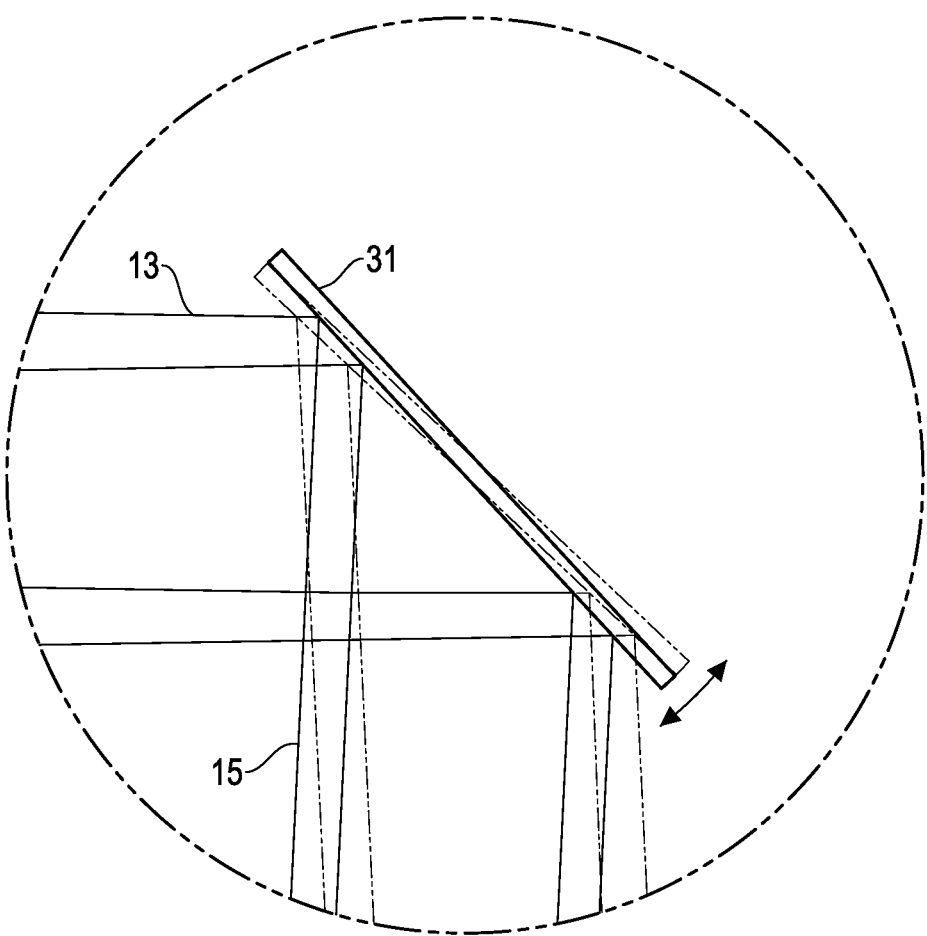
FIG. 5 is an enlarged schematic view of the beam path of the laser processing device according to a region "A" in FIG. 4.

With reference to FIGS. 1 and 5, preferably, the galvo mirror module 30 has at least one rotatable reflecting mirror 31 and at least one galvo driving device 33 driving the at least one reflecting mirror 31 to rotate to adjust a relative direction of the reflecting mirror 31. The incident ring beam 13 irradiating into the galvo mirror module 30 from incidence side I is reflected by the at least one reflecting mirror 31 into the reflected ring beam 15 toward the reflection side O.

Figure 4:
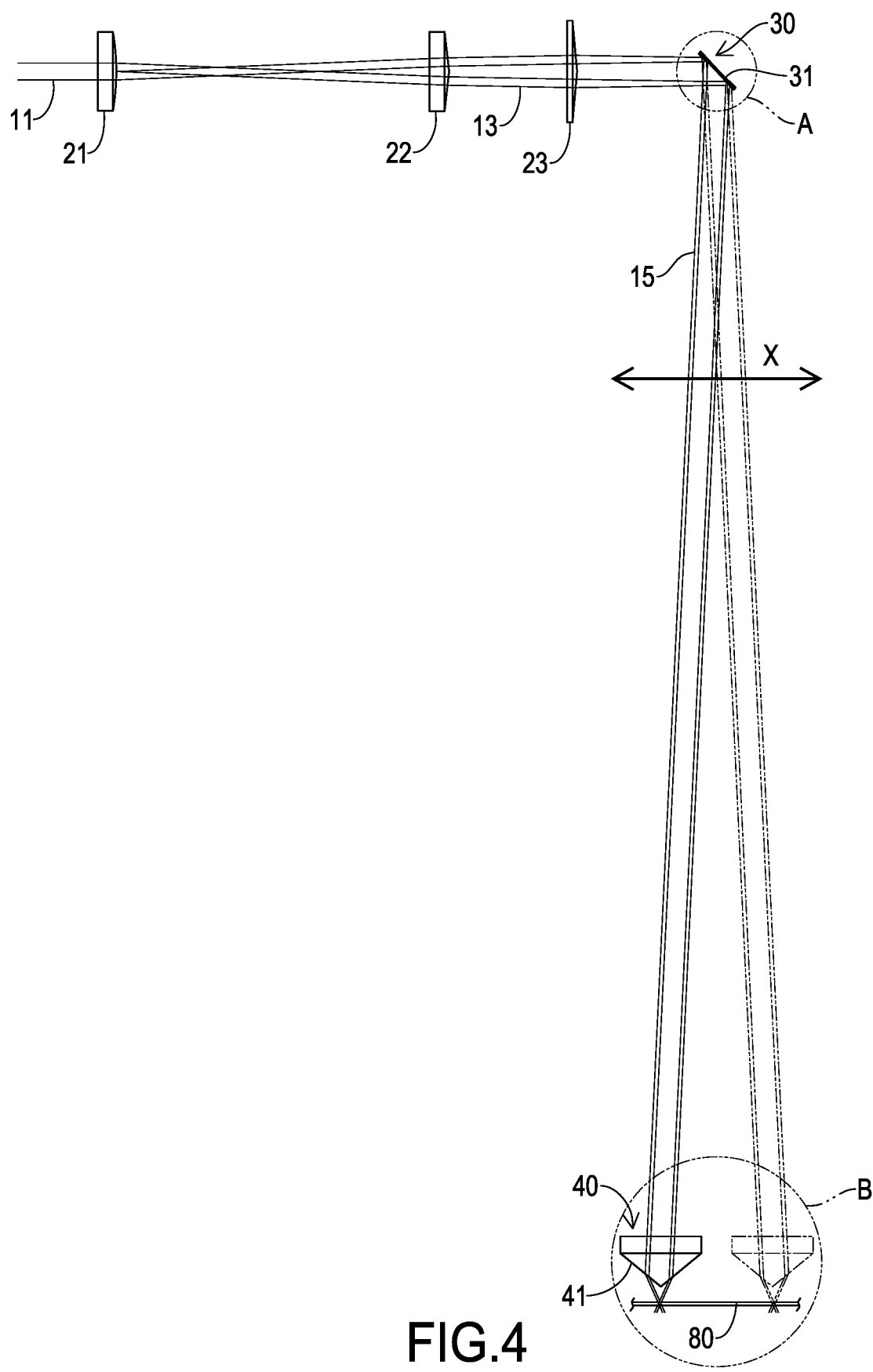
FIG. 4 is an operational schematic view of the beam path of the laser processing device in FIG. 1.
Figure 6:
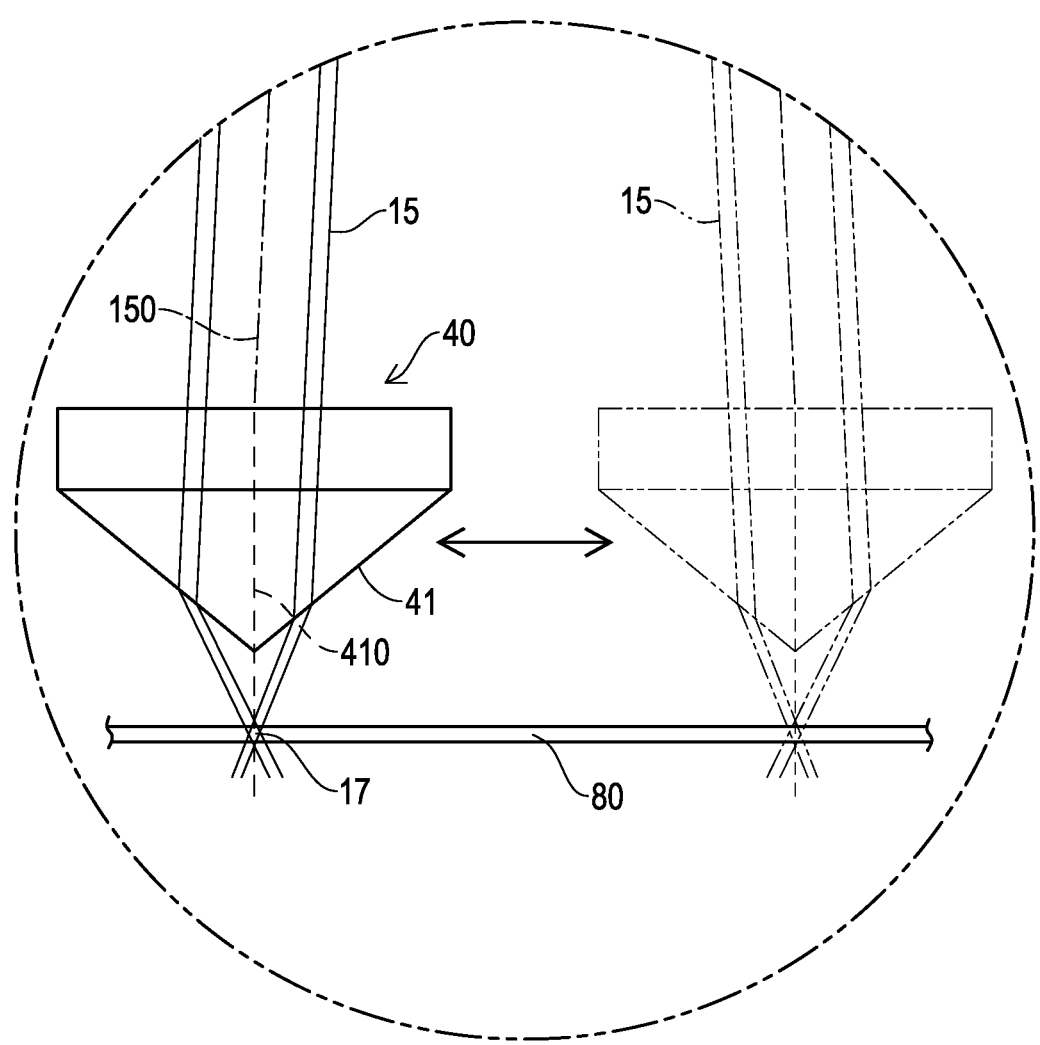
FIG. 6 an enlarged schematic view of the beam path of the laser processing device according to a region "B" in FIG. 4.

With reference to FIGS. 4 to 6, when a relative direction of the at least one reflecting mirror 31 is adjusted, a reflection direction of the reflected ring beam 15 relative to the scanning direction X of the galvo mirror module 30 is rotated. Whereby, an end of the reflected ring beam 15 away from the galvo mirror module 30 is moved along the scanning direction X of the galvo mirror module 30.

Figure 7:
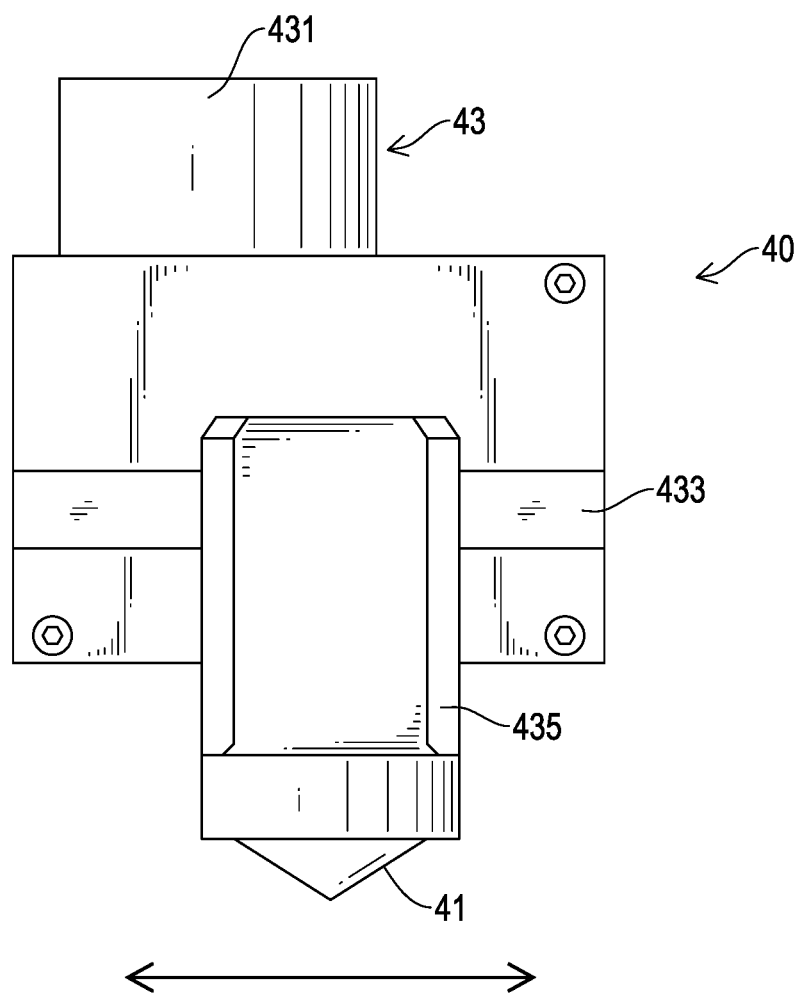
FIG. 7 is a side view of a focusing module of the laser processing device in FIG. 1.

With reference to FIGS. 1 and 7, the focusing module 40 has the third lens 41 and a shifter 43 driving the third lens 41 to linearly slide along the scanning direction X of the galvo mirror module 30. The shifter 43 has a driving motor 431, a connecting device, and a sliding base 435. The connecting device is connected between the driving motor 431 and the sliding base 435. The sliding base 435 is connected with a rail 433 and slides along the rail 433. The rail 433 extends along the scanning direction X of the galvo mirror module 30. The third lens 41 is mounted on the sliding base 435. The driving motor 431 drives the connecting device to drive the sliding base 435 to slide along the rail 433 to move the third lens 41 along the scanning direction X of the galvo mirror module 30. The connecting device may be a linkage mechanism, a lead screw mechanism, or a rack assembly. The shifter 43 may be a hydraulic cylinder having a retractable push rod to move the third lens 41 along the scanning direction X of the galvo mirror module 30.

With reference to FIGS. 4 to 7, when a relative direction of the at least one reflecting mirror 31 is adjusted, an angle of the reflected ring beam 15 relative to the scanning direction X of the galvo mirror module 30 is adjusted accordingly, whereby a relative position of the end of the reflected ring beam 15 is shifted along the scanning direction X of the galvo mirror module 30. The shifter 43 of the focusing module 40 simultaneously drives the third lens 41 to move along the scanning direction X of the galvo mirror module 30 to a corresponding position according to a relative movement of the end of the reflected ring beam 15. Therefore, when the reflected ring beam 15 passes into the third lens 41 at different angles, distance deviation formed between a central axis 150 of the reflected ring beam 15 and a focus axis 410 of the third lens 41 is reduced and deformation of the Bessel-like beam 17 focused by the third lens 41 is reduced.

With reference to FIGS. 1, 2, and 8, preferably, a fourth lens 23 is located between the galvo mirror module 30 and the second lens 22 and is coaxially aligned with the first lens 21. The fourth lens 23 may be a converging lens, e.g. a plano-convex lens or a bi-convex lens, and is configured to converge a ring thickness of the incident ring beam 13. Accordingly, a spot size of the Bessel-like beam 17 focused from the reflected ring beam 15 is converged to increase the laser fluence of the Bessel-like beam 17.

With reference to FIGS. 1 and 2, a beam expander 50 is located between the laser source 10 and the first lens 21 and is coaxially aligned with the first lens 21. The beam expander 50 may be a conventional beam expander 50 and is adapted to increase a beam diameter of the laser beam 11 from the laser source 11 and to reduce divergence of the laser beam 11. Accordingly, a spot size of the Bessel-like beam 17 is converged to increase the laser fluence of the Bessel-like beam 17.

With reference to FIGS. 4 to 6, with arrangement of the galvo mirror module 30 and the third lens 41 slid along the scanning direction X of the galvo mirror module 30, when the relative direction of the reflected ring beam 15 is adjusted by the galvo mirror module 30, the third lens 41 is simultaneously slid along the scanning direction X of the galvo mirror module 30 to a corresponding position. Although the central axis 150 of the reflected ring beam 15 and the focus axis 410 of the third lens 41 are non-coaxial to form an intersection angle, when the reflected ring beam 15 is transmitted through the third lens 41, the central axis 150 of the reflected ring beam 15 is extremely close to the focus axis 410 of the third lens 41. Therefore, phase difference because of the reflected ring beam 15 transmitted into the third lens 41 from different directions can be reduced, deformation of the Bessel-like beam 17 focused from the reflected ring beam 15 because of the reflected ring beam 15 transmitted into the third lens 41 from different directions can be reduced. Whereby, variations in shape and the laser fluence of the Bessel-like beam 17 focused at different positions are reduced. The focused position of the Bessel-like beam 17 relative to the substrate 80 along the scanning direction X of the galvo mirror module 30 can be rapidly adjusted for forming multiple through vias in the substrate 80 with similar good processing quality per through mircovia. Accordingly, manufacturing lead time for forming multiple through vias in the substrate 80 can be decreased with good processing quality per through via.

The longer a distance between the galvo mirror module 30 and the third lens 41, the smaller the rotation angle of the reflected ring beam 15 for moving per distance of the focused position of the Bessel-like beam 17. The deformation of the Bessel-like beam 17 is thereby reduced.

With reference to FIG. 3, because the third lens 41 can be slid along the scanning direction X of the galvo mirror module 30, the third lens 41 could be a lens with a larger converging angle α and a shorter focal length to decrease a length of the Bessel-like beam 17 to increase the laser fluence of the Bessel-like beam 17. Therefore, a higher laser fluence of the Bessel-like beam 17 is achieved by outputting a lower energy to form through vias with smoother interior surfaces and to reduce energy waste.

What is claimed is:

1. A laser processing device for forming vias comprising:
a galvo mirror module having an incidence side, a reflection side, and a scanning direction;
a first lens being an axicon lens and located at the incidence side of the galvo mirror module;
a second lens located between the first lens and the galvo mirror module and coaxially aligned with the first lens;
a focusing module located at the reflection side of the galvo mirror module and having a third lens linearly slid along the scanning direction of the galvo mirror module; and
a laser source configured to emit a laser beam through the first lens and the second lens to convert the laser beam into an incident ring beam; wherein
the galvo mirror module is configured to reflect the incident ring beam into a reflected ring beam;
the third lens of the focusing module is configured to covert the reflected ring beam into a Bessel-like beam;
the galvo mirror module is configured to shift a reflection direction of the reflected ring beam to move an end of the reflected ring beam along the scanning direction of the galvo mirror module; and
the third lens is slid to a corresponding position along the scanning direction of the galvo mirror module according to a relative movement of the end of the reflected ring beam.

2. The laser processing device for forming vias as claimed in claim 1, wherein a fourth lens is located between the second lens and the galvo mirror module, is coaxially aligned with the first lens, and is configured to converge a ring thickness of the incident ring beam.

3. The laser processing device for forming vias as claimed in claim 2, wherein a beam expander is located between the laser source and the first lens.

4. The laser processing device for forming vias as claimed in claim 3, wherein the third lens is an axicon lens.

5. The laser processing device for forming vias as claimed in claim 3, wherein the third lens is a converging lens.

6. The laser processing device for forming vias as claimed in claim 1, wherein the focusing module has a shifter driving the third lens to slide along the scanning direction of the galvo mirror module.

7. The laser processing device for forming vias as claimed in claim 2, wherein the focusing module has a shifter driving the third lens to slide along the scanning direction of the galvo mirror module.

8. The laser processing device for forming vias as claimed in claim 3, wherein the focusing module has a shifter driving the third lens to slide along the scanning direction of the galvo mirror module.

9. The laser processing device for forming vias as claimed in claim 4, wherein the focusing module has a shifter driving the third lens to slide along the scanning direction of the galvo mirror module.

10. The laser processing device for forming vias as claimed in claim 5, wherein the focusing module has a shifter driving the third lens to slide along the scanning direction of the galvo mirror module.

11. The laser processing device for forming vias as claimed in claim 6, wherein the galvo mirror module has at least one rotatable reflecting mirror and at least one galvo driving device driving the at least one reflecting mirror to rotate.

12. The laser processing device for forming vias as claimed in claim 7, wherein the galvo mirror module has at least one rotatable reflecting mirror and at least one galvo driving device driving the at least one reflecting mirror to rotate.

13. The laser processing device for forming vias as claimed in claim 8, wherein the galvo mirror module has at least one rotatable reflecting mirror and at least one galvo driving device driving the at least one reflecting mirror to rotate.

14. The laser processing device for forming vias as claimed in claim 9, wherein the galvo mirror module has at least one rotatable reflecting mirror and at least one galvo driving device driving the at least one reflecting mirror to rotate.

15. The laser processing device for forming vias as claimed in claim 10, wherein the galvo mirror module has at least one rotatable reflecting mirror and at least one galvo driving device driving the at least one reflecting mirror to rotate.

* * * * *